Aug. 18, 1953 — M. JONES — 2,648,971
LOCKING DEVICE
Filed March 1, 1949
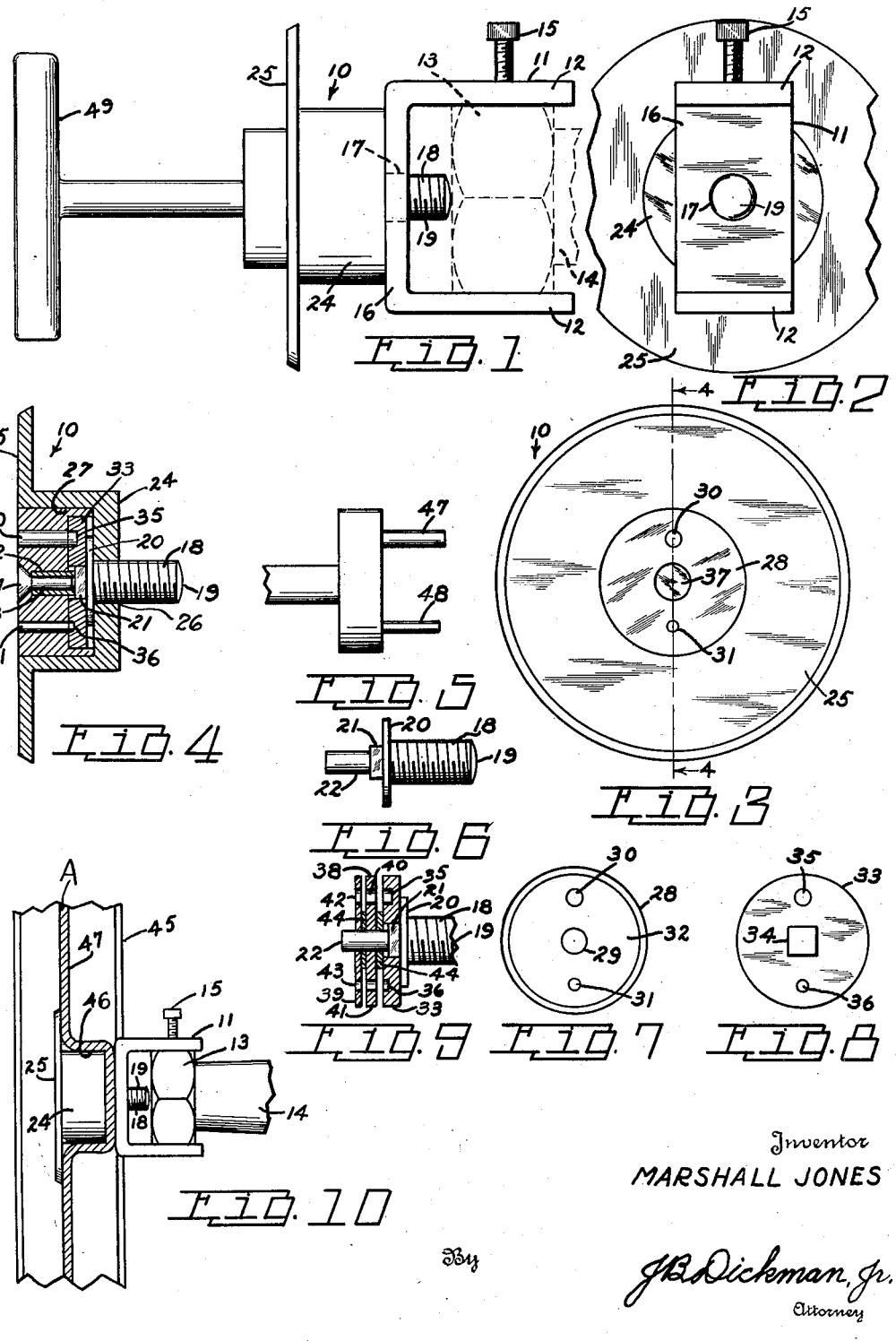
Inventor
MARSHALL JONES
By J. B. Dickman, Jr.
Attorney Patented Aug. 18, 1953

2,648,971

UNITED STATES PATENT OFFICE 2,648,971

LOCKING DEVICE

Marshall Jones, New York, N. Y.

Application March 1, 1949, Serial No. 78,951

3 Claims. (Cl. 70—229)

The present invention relates to a locking device.

The present invention is adapted for use in locking chests, doors, gates and the like, and in the present showing one example of the use of the locking device is shown as applied to an automobile wheel.

It is an object of the present invention to provide a locking device that is tamper proof.

Another object of the present invention is the provision of a locking device using a disc having a combination.

A still further object of the present invention is the provision of a locking device having means for engagement with a disc having combinations or discs having combinations.

A still further object of the present invention is the provision of means for engagement with a nut or an axle.

A still further object of the present invention is the provision of means for locking a wheel on an automobile axle.

A still further object of the present invention is the provision of a plurality of discs each having a combination.

With the above objects in view, the advantages of the present invention will become fully apparent as reference is made to the accompanying drawing, in which:

Figure 1 is a side elevational view of the locking device with a key in position, and a nut on an automobile axle, the nut and axle being shown in dotted lines.

Figure 2 is a rear elevational view of Figure 1.

Figure 3 is a front elevational view of the locking device with the key removed.

Figure 4 is a sectional view taken on line 4—4 of Figure 3 and looking in the direction of the arrows.

Figure 5 is a side elevational view of key showing the means for rotating the cylinder that houses the disc, and the shaft, the handle being shown fragmentarily.

Figure 6 is a side elevational view of the shaft or locking rod.

Figure 7 is a rear elevational view of the protecting cap.

Figure 8 is a front elevational view of the locking combination disc.

Figure 9 is an elevational view in section of a plurality of discs mounted on the locking rod or shaft, a portion of the shaft being shown fragmentarily.

Figure 10 is a sectional fragmentary view of an automobile wheel showing the locking device mounted in a depressed portion of an ornamental disc, positively locking the ornamental disc on the wheel of an automobile.

Referring to the drawing the numeral 10 represents the locking device for locking the ornamental disc A on the wheel, and it comprises a U-shaped member 11, that I term a power clamp, the legs 12 adapted for engagement with a nut 13 on an automobile axle 14, the nut and axle being shown in dotted lines. One leg of the power clamp 11 is provided with a lock screw 15 for securing the power clamp to the nut 13, the base 16 being provided with a centrally disposed threaded bore 17 that receives the threaded portion 18 of a locking shaft or rod 19. The locking rod or shaft 19 has a flange 20, a squared portion 21 and a shank 22 that is provided with a bore 23.

Upon the threaded portion 18 of the locking shaft or rod 19 there is mounted a pressure cap having a body 24, a flange 25 and a centrally disposed aperture 26 that is of a slightly larger diameter than the threaded portion 18 of the rod 19, thus allowing free movement of the threaded portion 18 therein.

The body 24 of the pressure cap is provided with a recess 27 that houses a cylinder 28 having a centrally disposed bore 29 that receives the shank 22 of the shaft 19; through bores 30 and 31, and a recess 32 in the rear end face, and it is to be noted that bore 30 is of larger diameter than bore 31. Within the recess 32 there is mounted a combination disc 33, having a centrally disposed aperture 34 that is square and it engages and is seated on the squared portion 21 of the shaft 19. The combination disc 34 is further provided with recesses 35 and 36 that are adapted for alignment with bores 30 and 31 respectively, and it is to be noted that recess 35 is deeper than recess 36 and larger in diameter. The cylinder 28 and the combination disc 33 are locked to the shaft 19 by a headed pin 37 that is sweated into the bore 23.

As shown in Figure 9 a plurality of combination discs 38 and 39 are mounted on the shank 22 and they are rotatable thereon, and as shown the discs may be of various thicknesses. Disc 38 is provided with through bores 40, 41; and disc 39 with through bores 42, 43, the bores being adapted for alignment respectively with recesses 35 and 36, the discs being held in spaced relation by washers 44. It is to be understood that when a plurality of combination discs are used, the recess 32 would of necessity be made deeper to accommodate the number of discs to be used.

In Figure 10 I have illustrated the application of my locking device for securing a wheel 45 of an automobile to the nut on an axle, and it is to be noted that the body or housing 24 is nested into a recessed disc portion 46 of the wheel 45, the flange 25 completely covering the recess 46. The drum to which the wheel is secured by bolts has been omitted for clarity and in view of the fact it forms no part of the present invention.

In the operation of my device the power clamp 11 is brought into engagement with a nut 13 on an axle 14 and when properly positioned it is made secure by tightening screw 15. Next the pins 47 and 48 on the key are inserted into the bores 30 and 31 and the cylinder 28 rotated by the handle 49 of the key until the pins 47 and 48 engage recesses 35 and 36. When the pins are in engagement with the respective recesses, the cylinder 28 is locked to the disc 33, the squared aperture 34 being in engagement with the squared portion 21 of the shaft 19, the assembly is then placed in the recess 46, the assembly then rotated by the key, the threaded portion 18 of the shank 19 being threaded into the threaded bore 17, and the turning action is continued until the rear wall of the housing 24 impinges the front face of the base 16 of the power clamp 11. When the housing is made fast to the power clamp the pins 47 and 48 on the key are withdrawn a sufficient distance to remove the pins out of recesses 35 and 36, and at this point the cylinder 28 is rotated in either a clockwise or counterclockwise direction to place the bores 30 and 31 out of alignment with the recesses 35 and 36. If a plurality of discs are used the same withdrawal procedure would be followed, the bores in the discs being out of alignment with the recesses and with each other, the bores in the cylinder also being misaligned.

With the present invention has been disclosed in connection with certain specific embodiments, it is to be understood that these are by way of example rather than by way of limitation and that the invention is to be defined by the attendant claims which should be given a scope as broad as is consistant with the prior art.

What is claimed is:

1. A locking device comprising a clamp, and a housing having a centrally disposed opening, a threaded shaft for engagement with said centrally disposed opening and said clamp, a spacing means carried by said threaded shaft, a squared portion on said spacing means, a shaft on said squared portion having a bore, means having bores mounted on the squared portion and held in spaced relation in said housing by said spacing means, a rotatable means mounted in said housing having bores and mounted on the shaft on said squared portion, a recess in one face of said rotatable means for receiving the means on the squared portion of said spacing means, the bores in said rotatable means adapted for alignment with the bores in the means on the squared portion on said spacing means, whereby access may be had to the bores on the means on the squared portion to rotate said shaft.

2. A locking device comprising a clamp and a housing having a centrally disposed opening, a threaded shaft for engagement with said centrally disposed opening and said clamp, a spacing means carried by said threaded shaft, a squared portion on said spacing means, a shaft on said squared portion having a bore, means having bores mounted on the squared portion and held in spaced relation in said housing by said spacing means, a rotatable means in said housing having bores and mounted on the shaft on said squared portion, a recess in one face of said rotatable means for receiving the means on the squared portion of said spacing means, the bores in said rotatable means adapted for alignment with the bores in the means on said squared portion, whereby access may be had to the bores on the means on the squared portion to rotate said shaft, and a pin engageable with the bore in the shaft on said squared portion for holding the rotatable means on the last named shaft.

3. A locking device comprising a clamp and a housing having a centrally disposed opening, a threaded shaft for engagement with said centrally disposed opening and said clamp, a spacing means carried by said threaded shaft, a squared portion on said spacing means, a shaft on said squared portion having a bore, means having bores mounted on the squared portion and held in spaced relation in said housing by said spacing means, a rotatable means in said housing having bores and mounted on the shaft on said squared portion, a recess in one face of said rotatable means for receiving the means on the squared portion of said spacing means, a plurality of discs having bores mounted on the shaft on the squared portion, means interposed between the plurality of discs for spacing said discs from each other and from the means on the squared portion, the bores in the rotatable means and in the plurality of discs adapted for alignment with the bores in the means on the squared portion, whereby access may be had to the bores on the means on the squared portion to rotate said shaft, and a pin engageable with the bore in the shaft on said squared portion for holding the rotatable means on the last named shaft.

MARSHALL JONES.

References Cited in the file of this patent

UNITED STATES PATENTS

| Number | Name | Date |
| --- | --- | --- |
| 1,173 | Finney | June 18, 1839 |
| 1,366,804 | Jackson | Jan. 25, 1921 |
| 1,744,340 | Smith | Jan. 21, 1930 |
| 2,005,535 | Duarte | June 18, 1935 |

FOREIGN PATENTS

| Number | Country | Date |
| --- | --- | --- |
| 25,509 | Great Britain | Nov. 26, 1908 |